US006059514A

United States Patent [19]

Sanchez

[11] Patent Number: 6,059,514

[45] Date of Patent: May 9, 2000

[54] METHOD AND APPARATUS FOR SLIPSHEET PALLETIZING OF MERCHANDISE UNITS

[75] Inventor: Armando L. Sanchez, Waverly, Ohio

[73] Assignee: Mills Pride, West Palm Beach, Fla.

[21] Appl. No.: 09/098,680

[22] Filed: Jun. 17, 1998

Related U.S. Application Data

[63] Continuation-in-part of application No. 08/943,962, Oct. 6, 1997, abandoned.

[51] Int. Cl.[7] .......... B65G 61/00

[52] U.S. Cl. .......... 414/661; 414/814; 414/280; 414/795.9; 108/51.3; 206/386

[58] Field of Search .......... 414/659, 814, 414/800, 661, 662, 280, 795.9, 796.5, 792.7, 801, 788.2, 802, 788.9, 812; 206/386; 108/51.1, 51.3, 52.1; 254/2 R, DIG. 4

[56] References Cited

U.S. PATENT DOCUMENTS

| | | | |
|---|---|---|---|
| 2,619,241 | 11/1952 | Jessen | 414/661 |
| 3,850,116 | 11/1974 | Mackes | 108/51 |
| 4,042,127 | 8/1977 | Brossia | 108/51.3 X |
| 4,159,887 | 7/1979 | Dick | 414/608 X |
| 4,205,938 | 6/1980 | Olson | 414/661 X |
| 4,871,063 | 10/1989 | Kumbier | 206/386 |
| 5,139,145 | 8/1992 | Cook | 206/386 |
| 5,297,916 | 3/1994 | Fujikaihng et al. | 414/661 |
| 5,316,433 | 5/1994 | Chase | 414/607 |
| 5,353,936 | 10/1994 | Dockstader et al. | 206/597 |
| 5,372,255 | 12/1994 | Skorski et al. | 206/386 |
| 5,503,517 | 4/1996 | Derby | 414/786 |
| 5,577,608 | 11/1996 | Hanson et al. | 206/386 |
| 5,692,874 | 12/1997 | Cordani et al. | 414/661 |
| 5,704,488 | 1/1998 | Smith | 108/51.3 X |

*Primary Examiner*—Frank E. Werner
*Attorney, Agent, or Firm*—Mueller and Smith, LPA

[57] ABSTRACT

System, method, and apparatus for carrying out the multi-level stacking and moving of merchandise units using lift trucks configured for slipsheet palletizing. The system employs a blocking assembly in conjunction with slipsheets employed for such warehousing practices. This blocking assembly preferably is formed of a corrugated polymeric material having a forward flap-like blocking component which extends downwardly from a die-formed crease over the packaged components of a lower assembled merchandise unit. The crease provides sufficient compressive stress distribution from abutting engagement with an errant lift truck forward fork tip to avoid damage to upper level packaged merchandise within the lower unit. The blocking assemblies are quite light and thin, and the flap-like blocking components thereof may be utilized as a slipsheet in the event that the grasping tab of a slipsheet is torn by the gripping mechanism of a lift truck. A storage assembly is provided for the blocking assemblies which retains them in a storage orientation wherein the blocking component is folded beneath the base region of a given blocking assembly.

27 Claims, 7 Drawing Sheets

METHOD AND APPARATUS FOR SLIPSHEET PALLETIZING OF MERCHANDISE UNITS

CROSS-REFERENCE TO RELATED APPLICATIONS

This application is a Continuation-in-Part of U.S. patent application Ser. No. 08/943,962 filed Oct. 6, 1997, now abandoned.

STATEMENT REGARDING FEDERALLY SPONSORED RESEARCH

Not applicable.

BACKGROUND OF THE INVENTION

The warehousing and transportation of merchandise has progressed essentially from the basket and cart to the highly efficient temporary storage and cargo handling of the present day. Traditionally, warehousing technology has employed racks of varying designs to store units of merchandise and/or where the packaging technique permits, the utilization of palletizing procedures. Pallets classically are provided as wood slat platforms combined by nailing or the like with supporting runners. Merchandise carried upon the pallet platforms is held in place by a variety of schemes such as boxing, banding, or blister packaging. Conventional palletizing approaches are received with disfavor for many merchandising and transportation applications. When palletized merchandising units are stacked one upon the next, there is a tendency for such stacks to lean. Generally, the palletized units will contain a substantial number of cardboard boxes carrying merchandise. Often, the runners or the like of an upwardly-disposed pallet will indent or distort the upwardly-disposed goods-carrying boxes within a lower level palletized unit. Nails and like connectors utilized with wooden pallets often damage adjacent units during handling. Particularly where the boxed merchandise is intended for delivery into the retail trade, blemished or distorted cardboard boxes must be replaced, a procedure requiring an unpacking of the palletized units, reboxing of the merchandise, and reassembling the palletized units. The handling of the palletized units typically is carried out by the ubiquitous forklift truck.

Over the past few decades, another form of palletizing, sometimes referred to as "slipsheet" palletizing has gained substantial popularity. With this approach, assemblies of merchandise-carrying cardboard boxes or similar assemblages are stacked one upon the other with the interposition of a thin polymeric slipsheet between adjacently stacked units. A variation of the forklift truck is employed (herein deemed a "lift truck") wherein one or more platen surfaces are provided at the location of conventional forked tines in conjunction with a pushing and retracting mechanism. In initially stacking one unit upon the top of another with interposed slipsheets, the pushing features of the lift truck are employed. To remove a top stacked unit from a next lower unit, a gripping device associated with the retracting mechanism grasps an outwardly disposed flap extension of the slipsheet and pulls the slipsheet and unit disposed thereon onto the lift truck platen. Unit assemblages weighing, for example, up to about 2,000 pounds, are stacked and manipulated with this procedure.

A variety of advantages accrue with the slipsheet palleting approach. Initially, they are observed to be much less expensive than pallets, for example by a factor of about 6. However, the cost of the slipsheets generally is a function of their thickness and size. In this regard, the thickness of the polymeric sheets is selected in accordance with the size and weight of the assembled merchandise units involved. Pallets and/or slipsheets typically are transported with merchandise and seldomly returned. Thus, initial significant savings are realized with their use. Assemblages or units used with the slipsheets stack straighter and tend not to cause damage to adjacent units during the course of handling. Damage due to wooden pallet runners and the like is avoided to the extent that many business entities require the use of slipsheet palletizing with respect to the products which they are purchasing.

While the above advantages are realized with the utilization of slipsheet palletizing, the approach is not without flaws. Principal among the features detracting from slipsheet palletizing systems is the dynamic relationship extant between the slipsheets with their associated loads and the gripping and retracting mechanism utilized for cargo handling. In this regard, as a slipsheet tab is grasped and the retracting mechanism is activated, the top of the next lower slipsheet palletizing unit may be drawn into the tips of the mechanism platen. Also, the tolerancing or play inherent in such mechanisms may cause the platen tips to be driven into that same region of the next lower unit. This action usually results in damage to the tip-contacted boxes and/or goods contained therein which are located at the top of the lower adjacent unit. Such damage typically is corrected by replacement, reboxing, and reassemblage of the unit. For large warehousing installations, the annual cost for such damage can be quite substantial. Often, those lost products are not readily reboxed or replaced, resulting in "short shipping" to the detriment of the purchaser. Such upper level damage well may be exacerbated by virtue of the sharpness of the platen tips. Lift truck operators often are observed to operate the trucks in a manner wherein the platen tips slide upon the concrete floors of a warehouse, thus to effect a sharpening of them.

Another detracting feature of the slipsheet palletizing system is concerned with the slipsheet tabs extending from the stack. The gripping and retracting mechanisms of the lift trucks often tear them off. The remedy typically requires that personnel unpack the units by hand at their elevated location and then reassemble the units at floor level. The cost associated with this corrective procedure is apparent. To ameliorate this problem, the slipsheets may be formed having tabs extending from multiple sides. Unfortunately, multiple side access often is not available to the lift trucks. Thus, while slipsheet palletizing systems have a variety of advantageous aspects, their use also invokes a substantial detracting cost element.

BRIEF SUMMARY OF THE INVENTION

The present invention is addressed to a handling system, method, and apparatus for carrying out the stacking of assembled merchandise units and for moving them from such a stack. Slipsheets continue to be used, however, they are employed in conjunction with relatively inexpensive but highly effective blocking assemblies. These blocking assemblies preferably are fabricated from a thin, flat and somewhat flexible polymeric material and are formed having a base region generally coextensive with the base region of the slipsheet with which they perform. This blocking assembly base region extends beneath a slipsheet to a forward edge of the stacked merchandise units and has formed with it a flap-like overlap blocking component. The union of that overlap blocking unit component with the base region preferably is defined by a die-formed crease. A rigidity established by downward folding of the blocking component serves to distribute those compressive forces caused by abutting encounters with the tip region of a lift truck platen-defining fork. Even though the blocking assemblies typically are somewhat thin, e.g. typically 6 mm and quite light, e.g. typically about 4 pounds, they provide practical and effective protection for the boxed merchandise otherwise damaged by lift trucks. Yearly savings occasioned by damage avoidance for a typical warehouse as a consequence of use of the system and method is quite substantial.

Other advantages accrue with the system and method at hand. Inasmuch as the blocking assemblies are positioned directly beneath and in adjacency with a slipsheet associated with a next upwardly adjacent located merchandise unit, where the grasping tab portion of such upper slipsheet is torn off by the lift truck gripping mechanism, the blocking component itself may be grasped by the lift truck mechanism to perform in place of the damaged slipsheet. This feature becomes available, inter alia, inasmuch as the materials from which the preferred embodiment of the blocking assemblies are made exhibits a tensile stress capability within a range from about 3700 psi to 4000 psi. This association between the superpositioned slipsheets and the blocking assembly also functions to improve the slidability of that upper-disposed slipsheet when a merchandise unit is being pulled onto the platen of a lift truck. Improved performance of the slipsheet is such that they may be made with a thinner thickness to the extent, for example, of about ⅓ of the thickness otherwise required. This results in monetary savings for the slipsheet components of the system.

In a preferred construction, each blocking assembly or apparatus is configured from a material formed as oppositely disposed parallel surfaces spaced apart by a core of flute-defined parallel channels and the noted crease is formed transversely with respect to those parallel channels.

In a preferred arrangement, the blocking component of the blocking assemblies will be provided with a color selected from the yellow to red region of the visible spectrum so as to provide a visual cue to the operator of a lift truck as to the location of a slipsheet at the interface between adjacent merchandise units. This visual cue aids the operator in determining the location of the grasping tab of the adjacent slipsheet and provides a further visual cueing as to the location of the vulnerable upper layer or region of merchandise in a next lowermost merchandise unit.

To protect the blocking assemblies while being stored for reuse, a storage assembly is incorporated with the system and method. This storage assembly provides for holding the blocking components beneath the base regions of the blocking assemblies and retaining them in that orientation under compression within a stack of blocking assemblies. A slidable carriage assembly is provided which enhances the folding procedure and retains a given stack of blocking assemblies in compression.

Other objects of the invention will, in part, be obvious and will, in part., appear hereinafter. The invention, accordingly, comprises the system, method and apparatus possessing the construction, combination of elements, steps and arrangement of parts which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Figure 1:
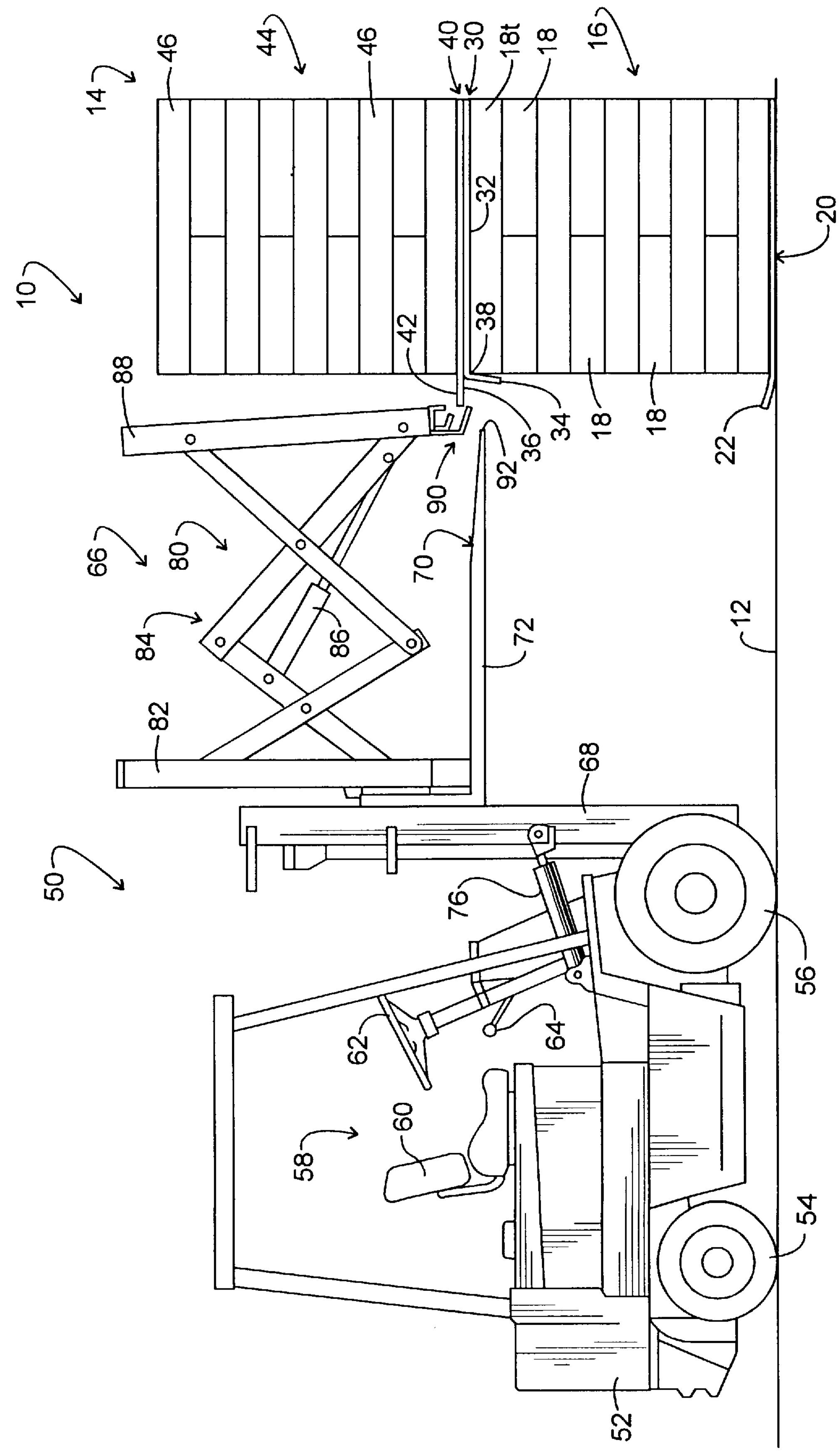
FIG. 1 is a side view illustrating the system and method of the invention, showing a stack of assembled merchandise units in conjunction with a lift truck preparatory to its engagement with a slipsheet.

Referring to FIG. 1, the handling system and method of the invention is represented generally at 10. This handling system serves to carry out the multi-level stacking and moving of assembled merchandise units. In this regard, a warehouse floor is represented at 12 upon which a stack 14 of assembled merchandise units is supported. The lowermost one of these merchandise units at 16 is seen resting upon the floor 12. Unit 16 typically is an assemblage of cardboard boxed merchandise, certain of these cardboard boxes are shown at 18. Typically, the boxes 18 of the unit 16 are retained in the rectangular or cubic unit shape shown by shrink wrapping. An entire unit 16 is seen to rest upon a slipsheet 20 which, in turn, is positioned upon the warehouse floor 12. Such slipsheet palletizing typically may be used for units 16 of up to about 2,000 pounds in weight, and the slipsheets 20 will be formed of a polymeric material for example having a 30 mil thickness. A somewhat typical size for the slipsheets is 51"×43", and they will be dimensioned to have an overlapping grasping tab portion, one of which is seen at 22. Usually, the slipsheets 20 will be adhered to the bottom of any such assembled merchandise unit 16, although that is not required. The slipsheets have been produced with a number of formulations. A description of the structuring of one such slipsheet is provided in U.S. Pat. No. 3,850,116 by Mackes, entitled "Slip Pallet Reinforced with Fillers", issued Nov. 26, 1974, and incorporated herein by reference.

In accordance with the present invention, a blocking assembly represented generally at 30 is positioned upon the uppermost layer of boxes, i.e. at 18*t*, of the assembled merchandise unit 16, and in particular, over the shrink wrap covering of the unit 16. This blocking assembly 30 has a flat base region 32 which is removably positioned over the top of unit 16. The assembly 30 further includes a downwardly extending blocking component 34 which extends from a linear boundary 36 at the base region 32. That boundary 36 is positioned over a forwardly disposed edge of unit 16 as seen at 38. The term "forwardly" is used herein in the sense that it is confrontable by a lift truck.

Positioned above the base region 32 is another slipsheet represented generally at 40 having a grasping tab portion 42 protruding from the lower forward edge of an uppermost assembled merchandise unit represented generally at 44. As in the case of unit 16, unit 44 is an assemblage of cardboard boxes, certain of which are identified at 46. Unit 44 typically will be packaged utilizing a shrink wrap technique. The number of units as at 16 and 44 will vary, but typically one observes them to be in stacks of about five or six such units from lowermost to uppermost, to reach stack heights of about 15 feet.

Poised before the stack 14 is a lift truck represented generally at 50. Lift truck 50 is of typical configuration having a chassis 52 supported upon four wheels, two of which are seen at 54 and 56. The chassis 52 is configured having an operator station 58 with a seat 60, steering wheel 62, and a variety of control levers, one of which is seen at 64.

Attached to the chassis 52 at the forward portion of the lift truck 50 is a transfer assemblage represented generally at 66. Assemblage 66 includes a frame structure 68 to which is movably attached a platen-defining receiving surface represented generally at 70 and which is comprised of two, L-shaped fork tines 72 and 74 (see FIG. 4). The receiving surface 70 is vertically movably mounted upon the frame structure 68 such that the operator may vertically position it for purposes of placing an assembled merchandise unit in a stack as at 14 or removing it. Orientation of the surface 70 further may be made in tilting fashion by the tilting of frame 68, for example, utilizing a hydraulic cylinder and piston arrangement as is shown at 76.

The widthwise extent of the platen-defining surface 70, i.e. from the outside of one forked tine 72 to the outside of the opposite forked tine 74, typically will be about 40 inches and the tines 72 and 74 themselves may be spaced apart about 15 inches. Mounted upon the surface 70 is an extensible and retractable gripping, pulling, and pushing mechanism 80. Mechanism 80 includes a rearwardly disposed frame 82 which is linked by a hydraulically-driven pantograph represented generally at 84. In this regard, note the hydraulic cylinder and piston 86. The pantograph 84 terminates in a pushing fixture 88 which is shown in FIG. 1 in its extended position. Note in the figure that the surface 70 is just below the slipsheet 40 beneath the uppermost unit 44. At the lower end of fixture 88 there is a gripping mechanism 90 which functions to engage and close down upon the slipsheet grasping tab portion 42. Upon completing this grasping maneuver, the pantograph 84 is actuated to retract toward the rearwardly disposed frame 82. Note in FIG. 1 that as the lift truck 50 addresses the stack 14, the tip region 92 of the platen surface 70 is somewhat spaced from the uppermost cardboard box 18*t* of the lowermost unit 16. Note, additionally, that the tip region 92 is in a confronting relationship with the blocking component 34 of blocking assembly 30. As is apparent, the visual acuity and manual skills of the operator of the lift truck 50 are called upon at this procedural step to discern grasping tab portion 42 of slipsheet 40 and accurately align the gripping portion 90 of the transfer assembly 66 to grasp it. To aid identification of the interface between unit 16 and unit 44, the location of the slipsheet 40 and its tab 42, blocking component 34 preferably is formed having an outwardly disposed bright color. In this regard, the color is selected from yellow through the red region of the spectrum, thus to provide visual cuing to promote this discernment by the operator of the location of grasping tab portion 42.

Figure 2:
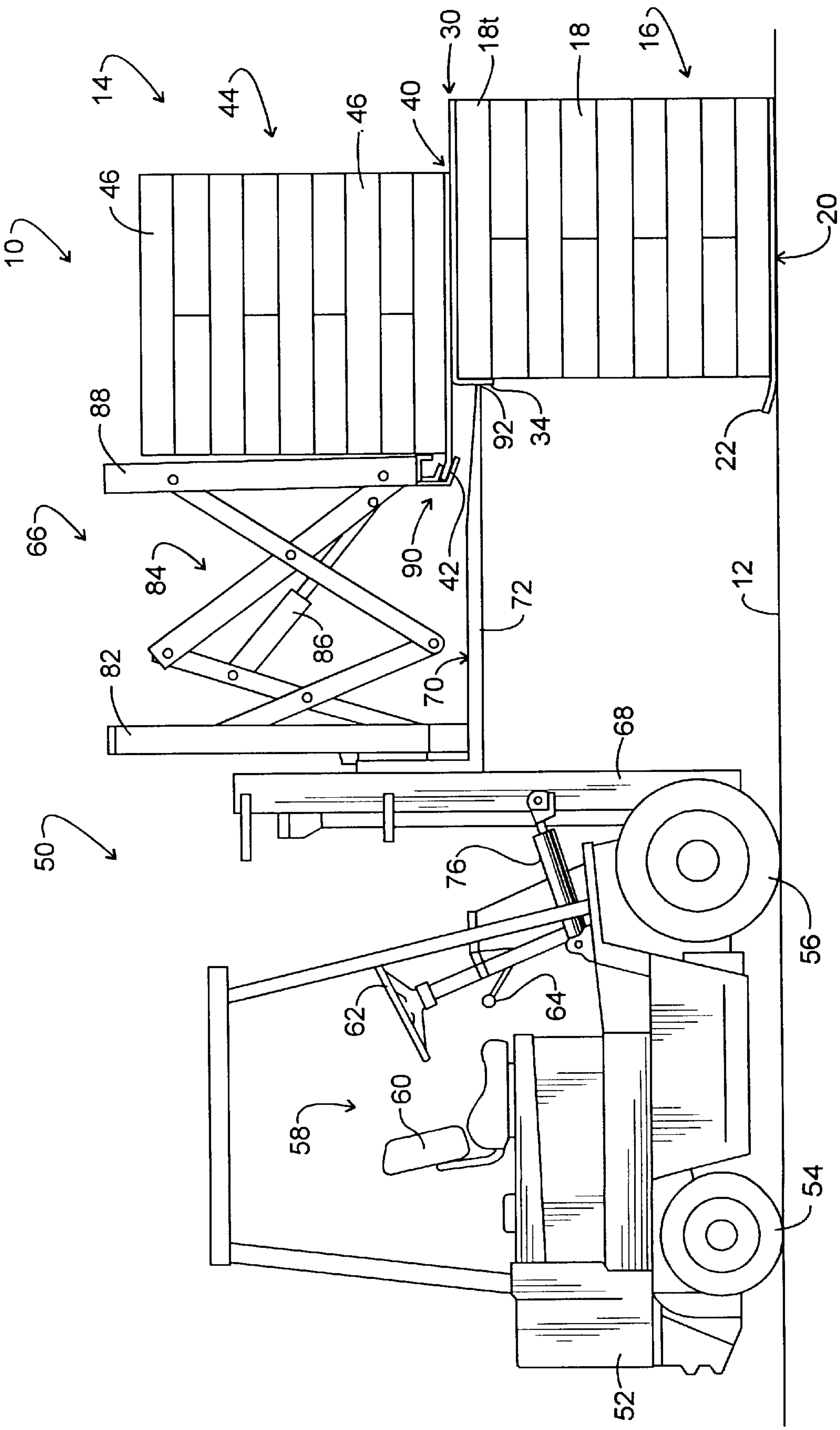
FIG. 2 is a side view of an uppermost assembled merchandise unit removal by gripping a slipsheet with a lift truck apparatus.

Looking to FIG. 2, the procedure for removing uppermost unit 44 from the stack 14 is seen to continue. In the figure, the gripping mechanism 90 of transfer assembly 66 has grasped the tab portion 42 of slipsheet 40 and pantograph 84 is retracting pushing fixture 88 while drawing the slipsheet 40 over the blocking assembly 30. This procedure will continue until the unit 44 is entirely supported by the platen defining surface 70. Unit 44 then may be transported by the lift truck 50 to a next desired location in the warehouse. Typically, that movement is to a loading dock region.

It is a characteristic of the transfer assemblages 66 and their association with lift trucks 50 that there is a substantial amount of "play" or movement in the involved vehicle and linkages. Additionally, as the uppermost unit 44 is withdrawn by sliding motion over top of the unit 16, there is a tendency for the stack 14 and, in particular, that unit as at 16 over which the upper unit is being slideably drawn over to tilt toward the transfer assemblage 66. This is represented in FIG. 2 wherein the tip region 92 is shown in a location adjacent blocking component 34. Even though the blocking component 34 may be quite thin, for example about 6 mm in thickness, and flexible, it will effectively function to protect the uppermost box 18*t*. Warehousing facilities utilizing slipsheet palleting but not having the blocking assemblies as at 30, experience substantial losses due to the damaging of the uppermost cardboard boxes as at 18.

Figure 3:
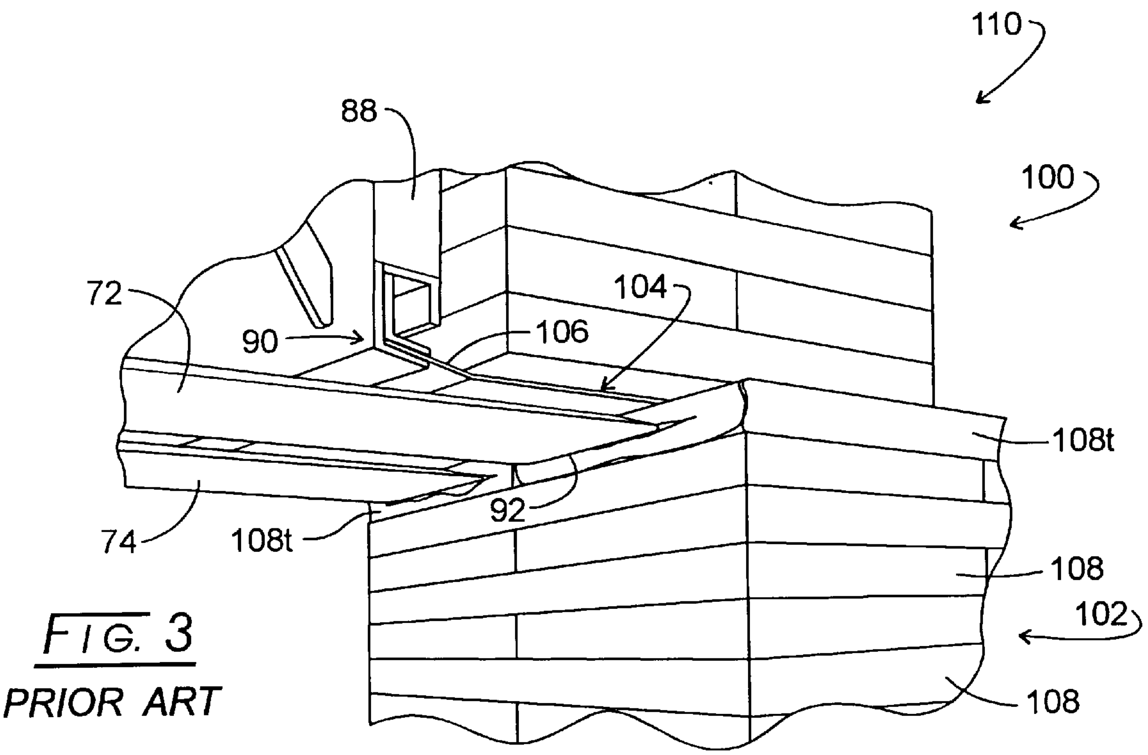
FIG. 3 PRIOR ART
FIG. 3 is a partial perspective view showing the damage typically encountered with procedures of the prior art.

Referring to FIG. 3, a representation of the typical type of damage experienced in the warehousing industry is illustrated. In the figure, an uppermost assembled merchandise unit 100 is being removed from its original position on top of a next lower assembled merchandise unit 102. In accordance with conventional practice, a slipsheet 104 is positioned beneath the unit 100 and its grasping tab portion 106 has been gripped by the gripping mechanism 90 of fixture 88. Certain of the cardboard boxes of unit 102 are shown at 108, the uppermost boxes being shown at 108*t*. The relative dynamics between the lift truck 50 and transfer assemblage 66 and stack of units 100 will, on excessive occasions, cause the tip region 92 of fork tines 72 and 74 to pierce the shrink wrap outer covering (not shown) of unit 102 and damage the upper cardboard boxes 108*t*. Notwithstanding substantial skill on the part of many lift truck operators in the warehousing industry, this type damage occurs with substantial frequency. Heretofore, the remedy has been to remove the unit 102 to a repair area, repackage the merchandise within boxes 108*t* with new boxes and reassemble the unit 102, for example, with a shrink wrap. The unit 102 then is returned to an appropriate stack in the warehouse.

Figure 4:
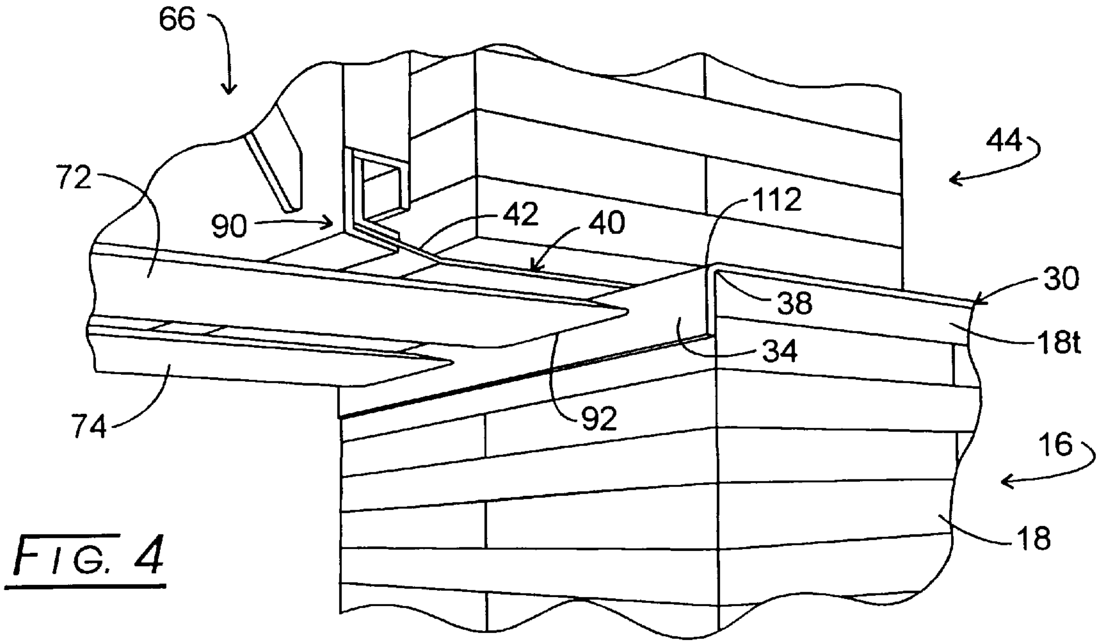
FIG. 4 is a partial perspective view showing the damage prevention aspects of the present system and method.

Looking to FIG. 4, a view similar to FIG. 3 but representing the procedure of FIG. 2, is revealed. Here the tip region 92 of the fork tines 72 and 74 have engaged the blocking component 34. Even though that component may be made of a thin flexible plastic, no damage occurs to the uppermost boxes 18*t*. Although the blocking component 34 is somewhat flexible, it is structurally rigidly supported by virtue, inter alia, of the crease or bend 112 which is located over the upper edge 38 of the lower unit 16. That bend is supported rigidly by the base region behind it which, in turn, is retained in its horizontal orientation by the weight of unit 44 positioned above it. Another advantage accrues with the utilization of the blocking assemblies 30 in a warehousing environment. Very often, the grasping tab portions 106 of slipsheets as at 104 will tear away from their associated base regions. If the lift truck cannot access another grasping tab of that uppermost unit with the damaged slipsheet from another direction, which often is the case, then personnel must undertake the corrective procedure of progressively lowering its contents to the warehouse floor. This procedure not only may be time consuming and thus costly, but also dangerous to personnel. Experience with the blocking assemblies 30 has shown that, in the event of a tearing away of grasping tab portions 42, the overlapping blocking component 34 can be grasped with the gripping mechanism 90 of the transfer assembly 66. While the protective function of the blocking component 34 is compromised, there remains an opportunity to remove the uppermost unit without damaging the top boxes of the next lower unit.

The method for assembling a stack as at 14 provides for positioning a first one of the units as at 16 upon the warehouse floor 12. This will typically have adhered to it a slipsheet as at 20 with grasping tab 22. Then, the flat base region of a blocking assembly is positioned on top of that first unit as described in conjunction with blocking assembly 30 in FIG. 1. Following the positioning of that assembly 30, the next unit as described at 44 typically with a slipsheet adhered to the bottom of it as at 40 is positioned on top of the blocking assembly 30. The positioning procedure with the lift truck 50 typically includes the positioning of the platen surface 72 somewhat over the base region or top surface 32 of the blocking assembly 30. The platen surface 70 may be tilted at this juncture. Then the transfer assembly 66 is actuated to slide the unit 44 off of the platen surface 70 and onto the top base region 32 of the blocking assembly 30. Of course, the slipsheets as at 40 may be manually positioned. As is apparent, the light weight and small thickness of the assemblies as at 30 makes their positioning quite simple and relatively effortless for operating personnel.

Figure 5:
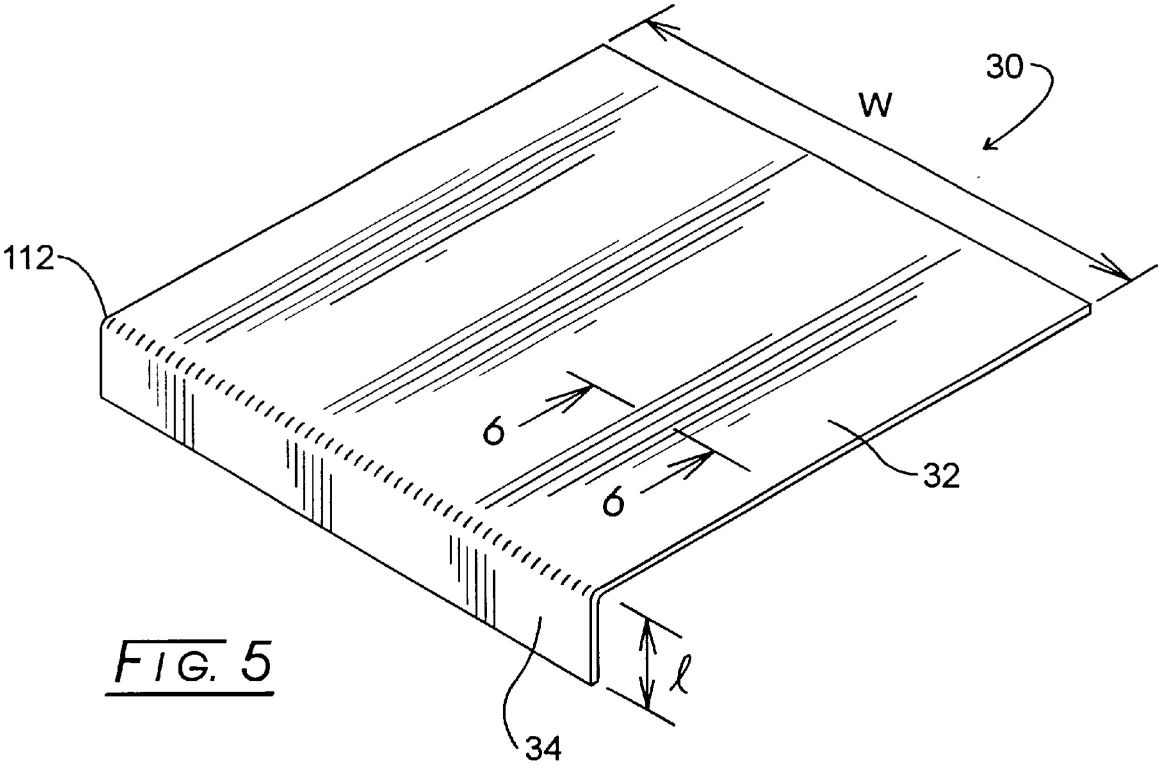
FIG. 5 is a perspective view of blocking apparatus according to the invention.
Figure 6:
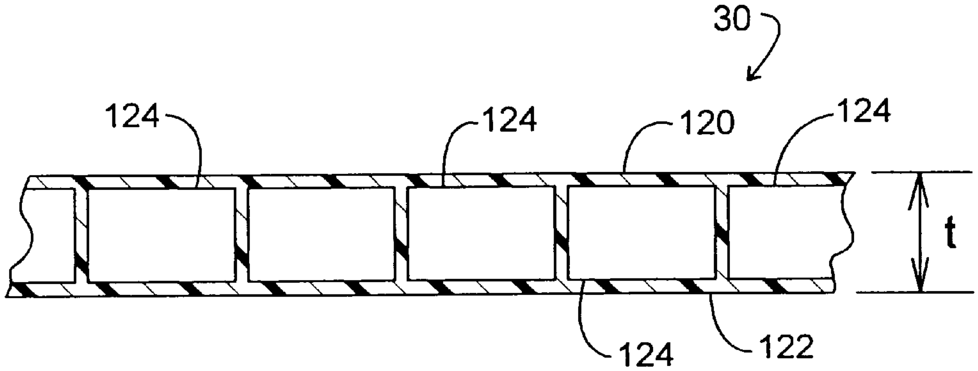
FIG. 6 is a sectional view taken through the plane 6—6 shown in FIG. 5.

Referring to FIGS. 5 and 6, a preferred embodiment for the blocking apparatus employed with the system and method of the invention is illustrated. Blocking apparatus 30 is shown to have a flat, polymeric base region 32 which is formed integrally with the polymeric overlap blocking component 34. Base region 32 preferably is configured so as to be coextensive with the corresponding base region of an associated slipsheet. Preferably, its widthwise extent, w, is selected to provide this coextensive arrangement. However, that width, w, should be at least as wide a the platen defined, for example, by the fork tines 72 and 74. As noted above, typically, that width from the outside edge to the outside edge of the tines will be about 40 inches. The base region 32 extends to a linear border defined by a crease 112 which, it may be recalled, nests over the upper edge 38 of the unit as at 16. The length, l, of the flat polymeric overlap blocking component 34 falls within a range of about 1 inch to 6 inches, a 4 inch length, l, being typically employed. By providing a crease at 112, the blocking component 34 becomes structurally rigid with respect to externally induced flexure as may be caused by the forward edge of fork tines.

The preferred material employed in the construction of the assemblies 30 is an extruded twin wall plastic sheet which is configured in corrugated fashion with a high impact polypropylene copolymer. The copolymer resins employed retain the ability to deflect a very substantial number of times without breaking. Looking additionally, to FIG. 6, the structure 30 is seen to be formed having oppositely disposed parallel surfaces or skins 120 and 122 which are spaced apart by a core of multiple parallel channels. These channels are defined by spaced-apart flutes as at 124. As represented in FIGS. 5 and 6, these flutes 124 run perpendicularly to the width, w, and run continuously to define the blocking component 34. The crease 112, which adds horizontal structural rigidity to flexure of the component 34 is die-formed transversely with respect to the channels defined by the parallel flutes 124. This substantially improves the rigidity of the component at the crease 112. The thickness, t, of the material employed preferably will fall within a range of from about 4 mm to about 10 mm. While thicker product may be employed, the benefit to be gained for most warehousing installations is unnecessary. The typically utilized thickness, t, is 6 mm which, for a product 30 employed with a conventional slipsheet, for example having dimensions of about 51 in×43 in, will result in an overall weight of about 4 pounds. The advantages of that light weight in terms of personnel handling the devices is quite apparent. Because of the ruggedness of the material involved, the devices 30 may be reuse over and over in a given installation. Of particular interest, because of the smooth plastic surface posed by the base region 32, the thickness of an associated slipsheet may be reduced by about ⅓. Thus, a typically utilized 30 mil thickness slipsheet may be reduced in thickness by about 10 mils with attendant savings in cost.

The twin wall plastic material preferred for producing blocking assemblies as at 30 are marketed by Coroplast, Inc. of Dallas, Tex. 75244. This material has the following characteristics:

| | | |
|---|---|---|
| Density, g/cc ASTM-D782A-2 | | 0.898–.901 |
| Notched izod impact (FT-lbs/in.) ASTM-D256-A | | |
| @ 70° F. | | 3.5–6.6 |
| @ −4° F. | | 1.0–.8 |
| Tensile strength at yield (psi units) ASTM-D638 2 in/min. | | 3,700–4,000 |
| Elongation at yield (%) | | 9–13 |
| Rockwell hardness, R scale ASTM-D785A | | 75–80 |
| Deflection temp. ° F. 66 psi | | 174–183 |
| ASTM-D648 246 psi | | 118 |
| Water absorption-24 hrs, % ASTM-D570 | | 0.02 |
| Falling weight impact strength @ −22° F. (ft. lbs.) | | 15 |
| Coefficient of linear thermal | −30° C. to 0° C. | 12 |
| expansion | 0° C. to 30° C. | 14 |
| (MM/MM/CX$^{-5}$°) ASTM D696 | 30° C. to 60° C. | 21 |
| Normal temperature performance range | | −17° F. to 230° F. |
| Melting point | | 162° C., 324° F. |

pH Nil-an inert polymer not reactive under the definition of acid and base.

The noted typically utilized 6 mm thickness, t, material has the following characteristics:

| | | | |
|---|---|---|---|
| Density (g/sq.m) | All colors | 1400 | ±5% |
| --(lbs/1000 sq. ft.) | | 286 | ±5% |
| Gauge | | 6.00 | ±.15 mm |
| Skin thickness | | .0180" | ±.0025" |
| Flute thickness | | .0180" | ±.0025" |
| Flute spacing | | .175" | ±.005" |
| Dyne level (dynes/cm) | | 46 | 46 minimum |

Figure 7:
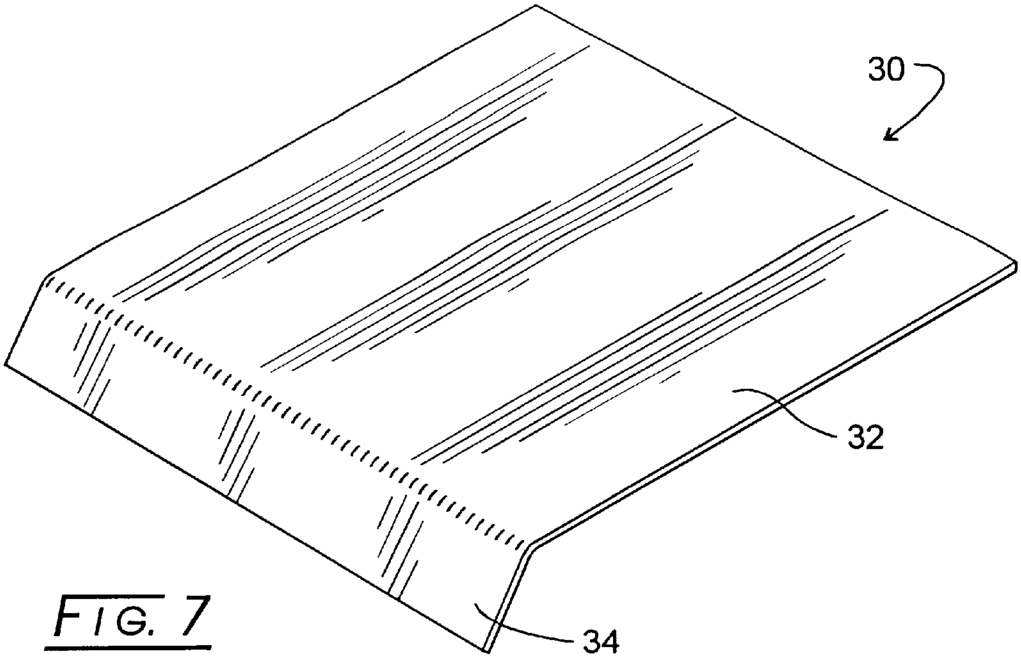
FIG. 7 is a perspective view of a blocking assembly following the misuse thereof.

Warehousing experience with the blocking apparatus of the invention and, in particular, those forms of the above-noted impact polypropylene copolymer with a core of multiple parallel channels, have revealed that a form of storage facility which sits in the warehouse environment will be beneficial for the reusability of the devices. As noted, particular advantage accrues because of the ruggedness of the material involved, permitting such cost saving reuse. In general, it has been observed that warehousing personnel will tend to misuse the blocking apparatus after removal from a stack of slip sheeted merchandise. Generally, they will be placed on the warehouse floor in a flattened orientation wherein the blocking component 34 is co-planar with the base portion. The devices then are walked upon or driven over with lift trucks and the like. The result of this damage is that for reuse, the blocking component will not properly fold downwardly at about a 90° angle with respect to the flat base region 32. Looking to FIG. 7, the orientation which the assembly 30 typically takes with such abuse is illustrated. Note in the figure that the blocking component 34 is at an obtuse angle to the extent that it becomes non-functional with respect to engaging the tip region 92 of a lift truck.

Such misuse now is avoidable with the installation of a relatively simple storage assembly within the environment of use of devices 30.

Figure 8:
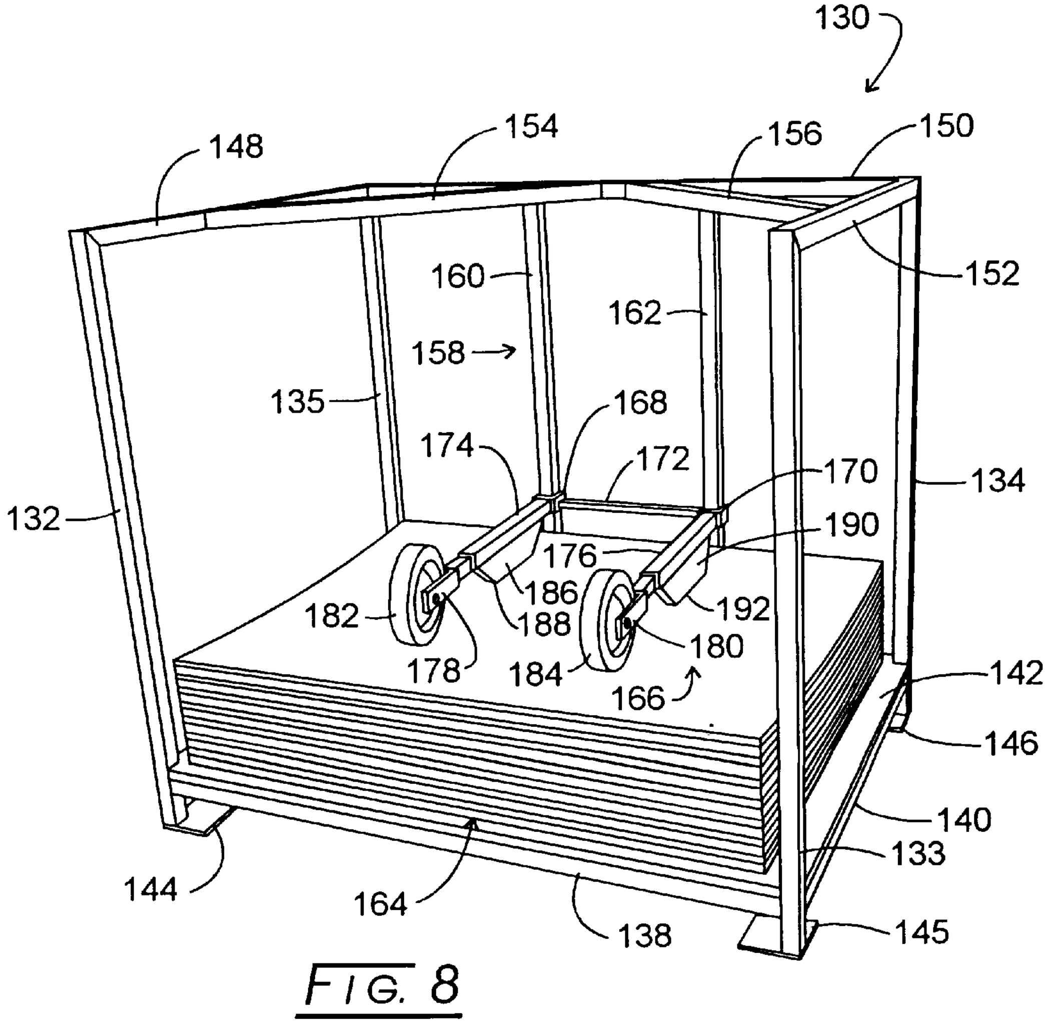
FIG. 8 is a perspective view of a storage assembly employed with the system and method of the invention.

Referring to FIG. 8 a storage assembly 130 is illustrated. The assembly 130 is formed of welded steel box beam material having four upstanding corner beams of square cross section identified at 132–135. Beams 132–135 are supported in their upstanding orientation by four floor beams, two of which are seen at 138 and 140. The floor beams, in turn, support a rectangular floor board 142. Floor board 142 may be formed, for example, of composite particle board such as MDF or the like. The floor board provides a flat bottom surface of the assembly 130. Corner beams 132–135 are mounted upon fiat steel spreader plates. In this regard, a spreader plate 144 is welded to corner beam 132; a spreader plate 145 is welded to the bottom of corner beam 133; and a spreader plate 146 is welded to the bottom of corner beam 134. A similar spreader plate (not shown) is welded to the bottom of corner beam 135. Corner beams 132 and 135 are mutually supported at their upper ends by an upper beam 148. Additionally, corner beams 134 and 135 are supported at their upper ends by an upper rear cross beam 150, and corner beams 133 and 134 are supported at their tipper ends by an upper beam 152. Attachment of beams 148, 150 and 152 is by welding. The front portion of assembly 130 in the vicinity of corner beams 132 and 133 is open and accessible by warehouse personnel through the utilization of two upper angularly oriented beams 154 and 156. In this regard, beam 154 is welded to upper beam 148 at a recessed location rearwardly located from the front portion of assembly 130. Its opposite connection is with upper rear crossbeam 150. Similarly, beam 156 is welded to upper beam 152 in a recessed manner and is welded to upper rear cross beam 150 at a location adjacent the connection of beam 154 therewith. This arrangement permits the open accessibility of the front portion of assembly 130. Additionally seen at the rear portion of assembly 130 is a carriage guide represented generally at 158. Guide 158 is formed of two, parallel upstanding posts or beams 160 and 162. Beams 160 and 162 are welded to upper rear cross beam 150 and to a parallel floor beam (not shown). Illustrated as being positioned upon the upper surface of floor board 142 is a stack of blocking assemblies represented generally at 164. The blocking assemblies of the stack 164 are maintained in a compressive state by a carriage represented generally at 166.

Carriage 166 is formed of a frame having two square collars 168 and 170 which an slidably positioned over respective upstanding posts 160 and 162. The fit of these collars is loose i.e., a very loose tolerance. The two collars are mutually joined by a cross beam 172 welded thereto and located intermediate the posts 160 and 162. Extending from the rearward portion of the assembly 130 toward the front portion and attached to collars 168 and 170 are two beam structures shown respectively at 174 and 176. These beams 174 and 176 extend forwardly to a fork-shaped axle supporting assemblies as shown respectively at 178 and 180. Assembly 178 supports a freely rotatable wheel 182, while assembly 180 supports a freely rotatable wheel 184. At any given time, the lowest surface of wheels 182 and 184 will be resting on the uppermost blocking assembly of the stack 164. Rearwardly of wheel 182, the beam structure 174 supports a downwardly depending compressor block 186 which has a lower compression surface 188 which also is in compressive engagement with the uppermost blocking assembly of the stack 164. In similar fashion, beam structure 176 supports a compressor block 190 having a corresponding compression surface 192. Note that both compression blocks 186 and 190 have angularly oriented front and rear edges. This is for the purpose of facilitating the movement of the uppermost one of the blocking assemblies 164 both in positioning it in the stack and removing it from the stack.

Carriage 166 performs appropriately where it is fabricated having a weight of about 175 pounds. Because of the very loose slidable connection of the collars 168 and 170, substantially all of this weight is applied to the stack 164 from the instantaneous lowest surface of wheels 182 and 184 and the compression surfaces 188 and 192.

Figure 9:
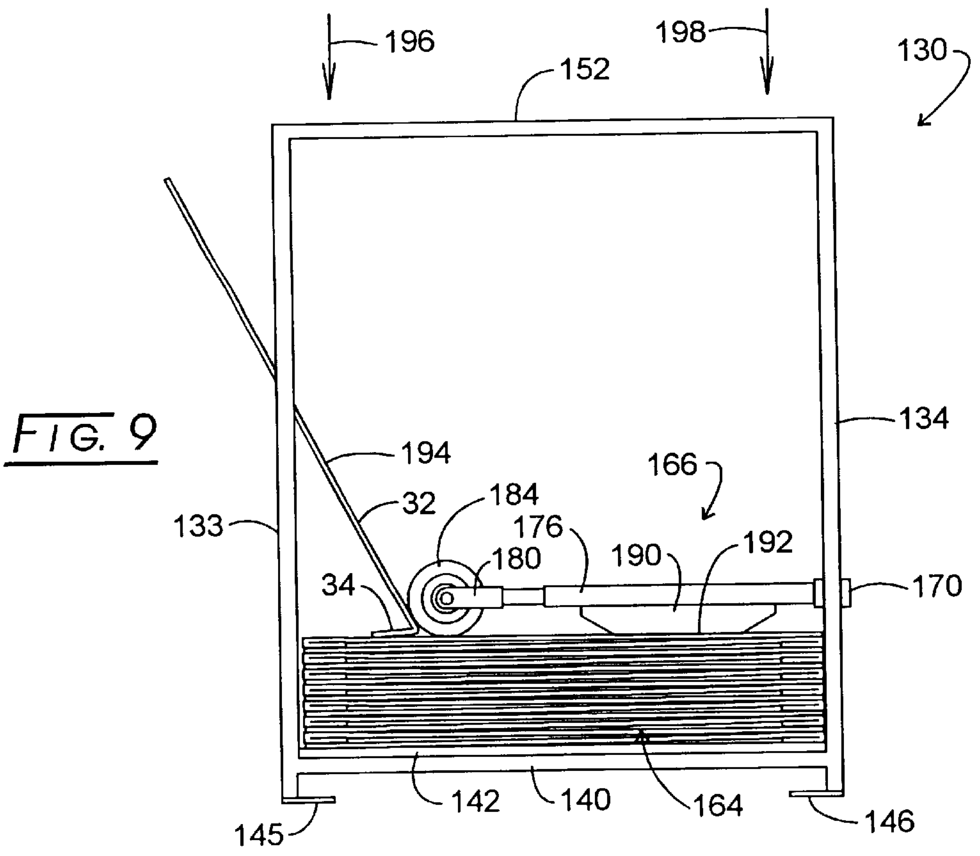
FIG. 9 is a side view of the storage assembly of FIG. 8 showing a method of insertion of a blocking assembly upon a stack of blocking assemblies.
Figure 10:
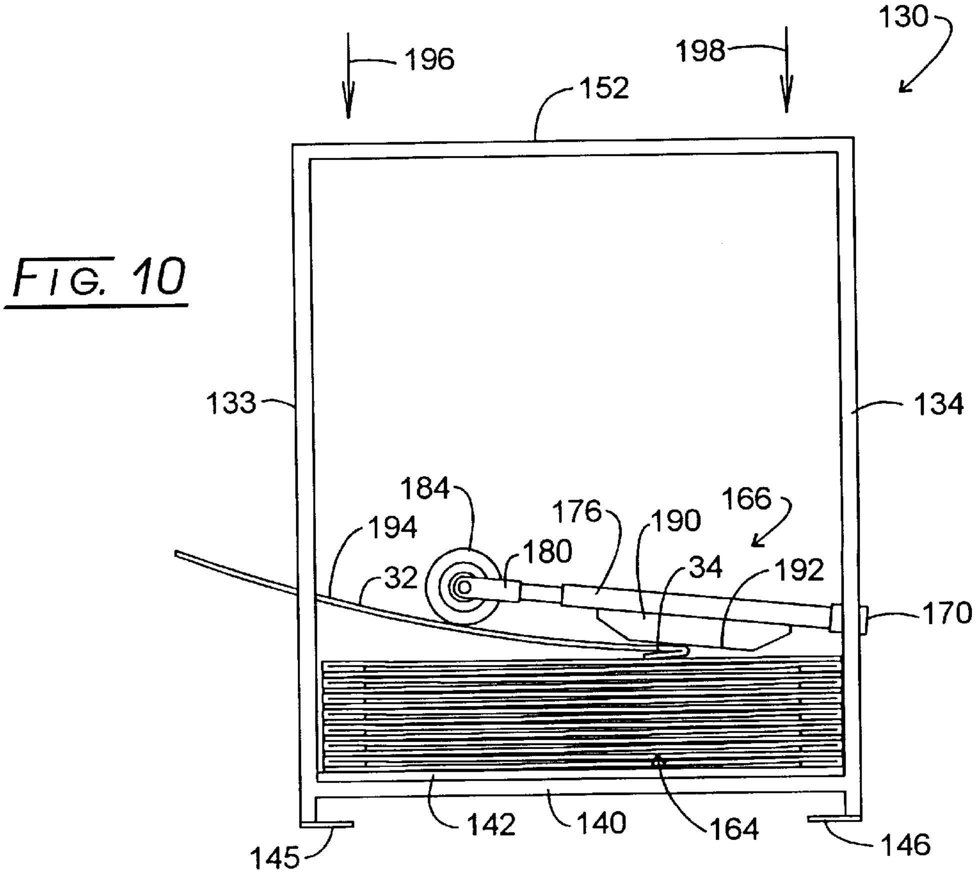
FIG. 10 is a side view of the storage assembly of FIG. 8 showing continuation of the procedure which is commenced in FIG. 9.
Figure 11:
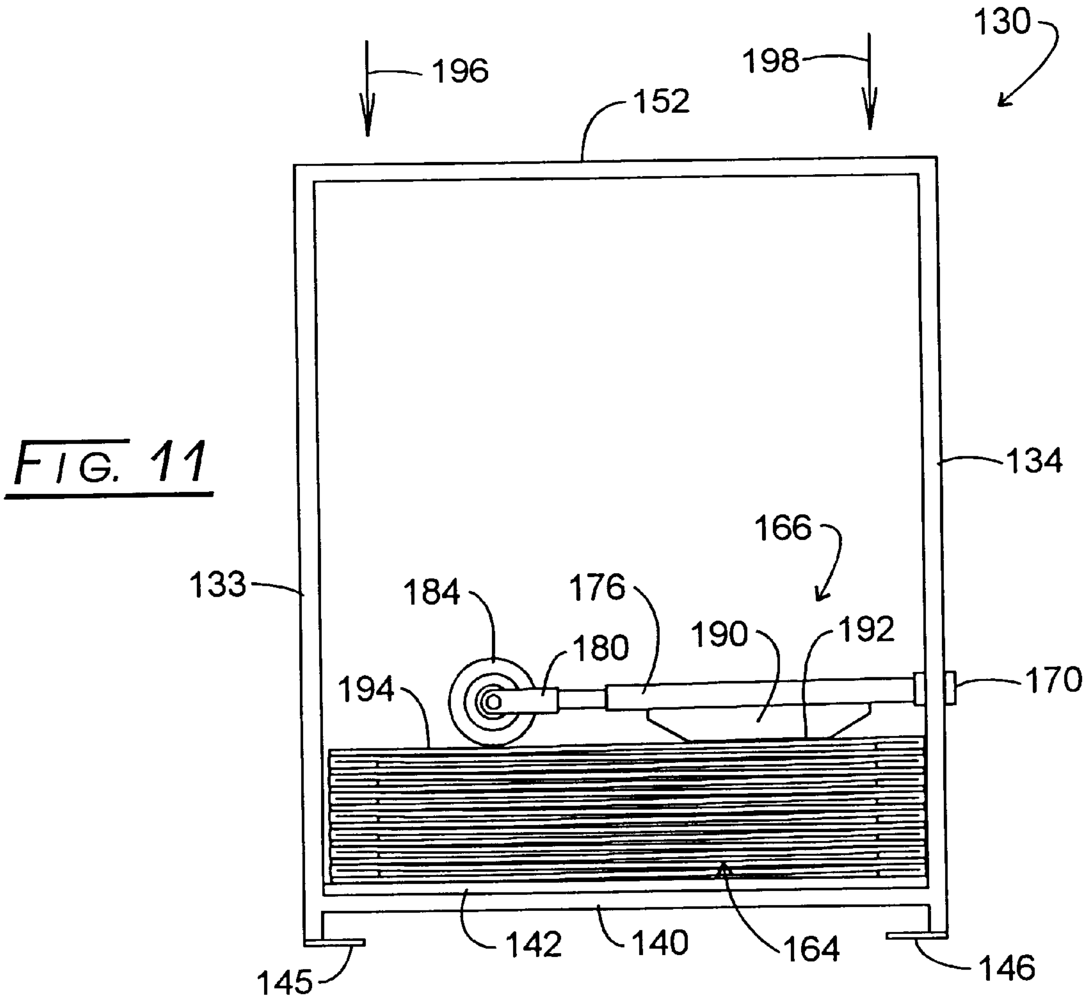
FIG. 11 is a side view of the storage of FIG. 8 showing a completion of insertion of a blocking assembly as commenced in connection with FIG. 9.

FIGS. 9 through 11 illustrate the procedure employed for inserting a blocking assembly, for example, as identified at 194 upon the stack of blocking assemblies 164. It is desirable that the uppermost blocking assembly of the stack 164 be level. Additionally, it is necessary that the blocking components be oriented in a storage orientation wherein they are folded beneath the flat base region of the blocking assembly. In order to maintain a level uppermost blocking assembly, therefore, they are stacked in the stack 164 in a manner wherein the blocking components are alternately at the forward portion and rearward portion of the storage assembly 130. In FIGS. 9–11, the forward portion of the assembly 130 is represented at arrow 196 and the rearward portion of the assembly is represented at arrow 198.

While folding the blocking component 34 beneath the base region 32 when the blocking component is to be located at the forward region 196 is simply carried out by hand, such folding procedure becomes problematic where the blocking component is to be located at the rearward region 198. The structuring of carriage 166 accommodates for this procedure. Looking to FIG. 9, a blocking assembly 194 is shown being inserted upon the stack 164. In doing this, the blocking component 34 is slightly bent by being pushed against the uppermost blocking assembly of the stack 164. Wheels 184 and 182 ride up over the base region 32 as the assembly 194 is pushed toward the rearward region 198. This is further illustrated in FIG. 10. In FIG. 10, the blocking component 34 is now essentially fully folded beneath base region 32 as it passes beneath compression surfaces 192 and 188. The user then slides the blocking assembly 194 into alignment with the stack 164 as shown if FIG. 11. Removal of the blocking assembly 194 is carried out by reversing this methodology. (Note that the loose tolerances of the collars 168 and 170 on respective posts 160 and 162 permits the angular orientation of carriage 166 seen in FIG. 10.)

Since certain changes may be made in the above system, method, and apparatus without departing fiom the scope of the invention herein involved, it is intended that all matter contained in the above description or shown in the accompanying drawings shall be interpreted as illustrative and not in a limiting sense.

What is claimed is:

1. A handling system for carrying out the multi-level stacking and moving of assembled merchandise units utilizing a lift truck having a transfer assemblage including a platen-defining receiving surface with a forwardly disposed tip region of given widthwise extent, extensible and retractable gripping, pulling and pushing mechanisms, movable to given elevations, said transfer assemblage being variably vertically positionable, comprising:

a blocking assembly including a flat first base region removably positioned upon the top surface of a first said assembled merchandise unit and extending thereover from a linear boundary located over a forwardly disposed edge of said unit, and having an overlap blocking component extending downwardly from said base region at said boundary adjacent said forwardly disposed edge a predetermined distance;

a slip sheet having a second base region removably slideably positioned upon said first base region and having a grasping tab portion extending outwardly from said forwardly disposed edge; and a second said assembled merchandise unit having a bottom surface positioned in stacked relationship over said second base region;

said blocking component predetermined distance being of an extent to abuttably engage said receiving surface tip region when said gripping mechanism is engaged with said slip sheet tab portion and said pulling mechanism retracts said second assembled merchandise unit upon said receiving surface by pulling said slip sheet with said first assembled merchandise unit upon said receiving surface, said blocking component being formed of a material effective to distribute compressive forces imposed thereon by abutting contact with said forwardly disposed tip region to an extent avoiding damage to contiguous merchandise retained within said first assembled merchandise unit.

2. The handling system of claim 1 in which said flat first base region is integrally formed with said blocking component of polymeric material.

3. The handling system of claim 1 in which said overlap blocking component is a flat polymeric flap.

4. The handling system of claim 1 in which said flat first base region is formed of polymeric material and is coextensive with said second base region to an extent effective to enhance the slideability of said second base region over said first base region.

5. The handling system of claim 1 in which said overlap blocking component extends a predetermined distance of between about one and six inches.

6. The handling system of claim 1 in which said flat first base region and said blocking component are integrally formed of polymeric material, said blocking component being defined by a die-formed crease extending along said linear boundary in parallel with an edge of said material and spaced inwardly therefrom said predetermined distance.

7. The handling system of claim 6 in which said first base region and said blocking component are formed as oppositely disposed parallel surfaces spaced apart by a core of multiple parallel channels, and said crease is formed transversely with respect to said parallel channels.

8. The handling system of claim 7 in which said first base region and said blocking component exhibit a tensile stress capability within a range from about 3700 psi to 4000 psi.

9. The handling system of claim 7 in which said first base region and said blocking component are integrally formed of extruded polypropylene copolymer.

10. The handling system of claim 1 in which said overlap blocking component has a color selected from the yellow through red region of the visible spectrum effective to promote visual discernment by the operators of said lift truck of the interstice between said first base region and said second base region.

11. The handling system of claim 1 in which said overlap blocking component has a widthwise extent at least coextensive with said tip region widthwise extent and extends a said predetermined distance of between about one and six inches.

12. A method of handling a given number of assembled merchandise units, each having an upper edge and upper surface extending therefrom, with respect to a vertically oriented stack thereof from lowermost to uppermost, comprising the steps of:

(a) providing a lift truck having a transfer assemblage including a platen-defining receiving surface with a forwardly disposed tip region of given widthwise extent, extensible and retractable gripping, pulling and pushing mechanisms;

(b) providing blocking assemblies, each including a first flat base region extending to a linear boundary and having an overlap blocking component extending from said linear boundary a predetermined distance;

(c) providing slip sheets each having a second base region and a grasping tab portion extending therefrom;

(d) positioning said lowermost unit at a stacking site, the said upper edge thereof being accessible to said lift truck;

(e) positioning a said blocking assembly first flat base region over the said upper surface of said lowermost unit and aligning said boundary with said upper edge, said blocking component extending downwardly therefrom;

(f) positioning a said slipsheet second base region over said first flat base region such that said tab portion extends outwardly from said boundary;

(g) positioning a next said unit upon said positioned slipsheet second base region with said lift truck transfer assemblage;

(h) reiterating steps (e) through (g) until said uppermost unit is positioned;

(i) positioning said lift truck in adjacency before said stacking site;

(j) extending said gripping mechanism into grasping attachment with the said tab portion of that uppermost said slipsheet in contact with the bottom of said uppermost unit, said tip region being in abuttable adjacency with the uppermost said overlap blocking component immediately beneath said second base region of the said slipsheet, the tab portion of which has been gripped; and (k) pulling said uppermost slipsheet and uppermost unit with said pulling mechanism onto said receiving surface by sliding said second base region over the adjacent uppermost said first base region.

13. The method of claim 12 in which each said blocking component of said blocking assemblies predetermined distance is between about one inch and six inches.

14. The method of claim 12 in which each of said blocking assemblies is provided having a said first flat base region with a polymeric material surface for enhancing a sliding relationship with an adjacently disposed said second base region.

15. The method of claim 12 in which said flat first base region and said blocking component of each said blocking assembly are provided as being integrally formed of polymeric material, each said blocking component being defined by a die-formed crease extending along said linear boundary.

16. The method of claim 15 in which said flat first base region and said blocking component of each said blocking assembly are provided as oppositely disposed parallel surfaces spaced apart by a core of multiple parallel channels, and each said crease is formed transversely with respect to said parallel channels.

17. The method of claim 16 in which each said blocking assembly is provided exhibiting a tensile stress capacity in a direction along said parallel channels from between about 3700 psi and 4000 psi.

18. The method of claim 12 in which each said blocking component is provided having a color selected from the yellow through red region of the visible spectrum.

19. The method of claim 12 in which said steps (f) and (g) are carried out simultaneously, said second base region being adhered to the bottom of a said unit.

20. The method of claim 12 including the steps of:

(l) releasing said gripping mechanism from said tab portion when said gripped tab portion has torn; then (m) gripping said uppermost blocking component with said gripping mechanism; and (n) pulling said uppermost blocking component and its associated first base region and uppermost unit with said pulling mechanism onto said receiving surface.

21. A handling system for carrying out the multi-level stacking and moving of assembled merchandise units utilizing a lift truck having a transfer assemblage including a platen-defining receiving surface with a forwardly disposed tip region of given widthwise extent, extensible and retractable gripping, pulling and pushing mechanisms, movable to given elevations, and said transfer assemblage being variably vertically positionable, comprising:

a blocking assembly including a flat first base region removably positioned upon the top surface of a first said assembled merchandise unit and extending thereover from a linear boundary located over a forwardly disposed edge of said unit, and having an overlap blocking component extending downwardly from said base region at said boundary adjacent said forwardly disposed edge a predetermined distance, said flat first base region and said blocking component being integrally formed of polymeric material, said blocking component being defined by a die-formed crease extending along said linear boundary in parallel with an edge of said material and spaced inwardly therefrom said predetermined distance;

a slip sheet having a second base region removably slideably positioned upon said first base region and having a grasping tab portion extending outwardly from said forwardly disposed edge;

a second said assembled merchandise unit having a bottom surface positioned in stacked relationship over said second base region;

said blocking component predetermined distance being of an extent to abuttably engage said receiving surface tip region when said gripping mechanism is engaged with said slip sheet tab portion and said pulling mechanism retracts said second assembled merchandise unit upon said receiving surface, said blocking component polymeric material being effective to distribute compressive forces imposed thereon by abutting contact with said forwardly disposed tip region to an extent avoiding damage to contiguous merchandise retained within said first assembled merchandise unit; and a storage assembly having a flat bottom surface for storing an aligned plurality of said blocking assemblies in a stack, each blocking assembly being in an orientation wherein said overlap blocking component is in a storage orientation folded beneath said flat first base region, said storage assembly having a rearward portion and an open, assessable front portion having a widthwise extent effective for accepting and providing access to said blocking assemblies, an upstanding carriage guide fixed to said assembly at said rearward portion, a carriage vertically slideably movable upon said carriage guide and extending therefrom to at least one freely rotatable wheel having a lowest surface compressibly engageable with the uppermost one of said blocking assemblies in said stack to effect retention of said storage orientation.

22. The handling system of claim 21 in which said carriage includes:

a frame slideably supported upon said upstanding carriage guide and extending therefrom to support said wheel; and a compressor block extending downwardly from said frame and having a compression surface engagable in compression transfer relationship with said uppermost one of said blocking assemblies.

23. The handling system of claim 22 in which said frame is mounted for pivotal movement about said carriage guide.

24. The handling system of claim 23 in which:

said carriage guide comprises first and second upstanding posts arraigned in spaced apart, parallel relationship;

said frame comprises first and second collars loosely slideably mounted upon respective said first and second upstanding posts, a first beam fixed to said first collar and extending to support a first said wheel in the vicinity of said front portion, a first said compressor block fixed to and extending downwardly from said first beam, a second beam fixed to said second collar and extending to support a second said wheel in the vicinity of said front portion, and a second said compressor block fixed to and extending downwardly from said second beam.

25. A method of handling a given number of assembled merchandise units, each having an upper edge and upper surface extending therefrom, with respect to a vertically oriented stack thereof from lowermost to uppermost, comprising the steps of:

(a) providing a lift truck having a transfer assemblage including a platen-defining receiving surface with a forwardly disposed tip region of given widthwise extent, extensible and retractable gripping, pulling and pushing mechanisms;

(b) providing blocking assemblies, each including a first flat base region extending to a linear boundary and having an overlap blocking component extending from said linear boundary a predetermined distance, each said flat first base region and said blocking component being integrally formed of polymeric material, each said blocking component being defined by a die-formed crease extending along said linear boundary in parallel with an edge of said material and spaced inwardly therefrom said predetermined distance;

(c) providing a storage facility having a flat bottom surface upon which are stored an aligned plurality of said blocking assemblies in a stack, each blocking assembly being in an orientation wherein said overlap blocking component is in a storage orientation folded beneath said flat first base region; said storage assembly having a rearward portion and an open, accessible front portion having a widthwise extent effective for accepting and providing access to said blocking assemblies, and means for applying a compressive force to the uppermost disposed said blocking assembly of said stack;

(d) providing slip sheets each having a second base region and a grasping tab portion extending therefrom;

(e) positioning said lowermost unit at a stacking site, the said upper edge thereof being accessible to said lift truck;

(f) procuring a said blocking assembly from said storage facility;

(g) positioning a said procured blocking assembly first flat base region over the said upper surface of said lowermost unit and aligning said boundary with said upper edge, said blocking component extending downwardly therefrom;

(h) positioning a said slipsheet second base region over said first flat base region such that said tab portion extends outwardly from said boundary;

(i) positioning a next said unit upon said positioned slipsheet second base region with said lift truck transfer assemblage; and (j) reiterating steps (g) through (i) until said uppermost unit is positioned.

26. The method of claim 25 in which said steps (h) and (i) are carried out simultaneously, said second base region being adhered to the bottom of a said unit.

27. The method of claim 25 including the steps of:

(k) positioning said lift truck in adjacency before said stacking site;

(l) extending said gripping mechanism into grasping attachment with the said tab portion of that uppermost said slipsheet in contact with the bottom of said uppermost unit, said tip region being in abuttable adjacency with the uppermost said overlap blocking component of a said uppermost blocking assembly immediately beneath said second base region of the said slipsheet, the tab portion of which has been gripped;

(m) pulling said uppermost slipsheet and uppermost unit with said pulling mechanism onto said receiving surface by sliding said second base region over the adjacent uppermost said first base region; and (n) placing said uppermost blocking assembly in said storage facility stack in a manner wherein said blocking component thereof is in said storage orientation.

* * * * *